United States Patent [19]

Geary et al.

[11] Patent Number: 4,577,103
[45] Date of Patent: Mar. 18, 1986

[54] METHOD AND APPARATUS FOR HIGH SPEED, SUSTAINED RECORDING OF INFRARED LASER BEAM PATTERNS

[75] Inventors: Joseph M. Geary, Edgewood, N. Mex.; Darius S. Vunck, Redondo Beach, Calif.; Dennis C. Duneman; Ronald L. Sessions, both of Albuquerque, N. Mex.; Charles E. Moeller; Raymond V. Wick, both of Albuquerque, N. Mex.

[73] Assignee: The United States of America as represented by the Secretary of the Air Force, Washington, D.C.

[21] Appl. No.: 643,138

[22] Filed: Aug. 22, 1984

[51] Int. Cl.$^4$ .................. G03B 42/00; G03C 5/16
[52] U.S. Cl. ..................... 250/316.1; 250/330
[58] Field of Search ..................... 250/316.1, 330; 352/200, 180, 39; 315/156, 157, 158; 356/23, 25

[56] References Cited

U.S. PATENT DOCUMENTS 4,018,608 4/1977 Frazier .................. 92/27 E

FOREIGN PATENT DOCUMENTS 250580 10/1961 Australia .................. 315/157

OTHER PUBLICATIONS

Gene F. Frazier et al., Infrared Photography, Applied Optics/vol. 15, No. 6/Jun. 1976, pp. 1350–1352.
David Naor et al., IR Laser Photograph with Silver Halide Emulsion, Applied Optics/vol. 20, No. 14/15 Jul. 1981, pp. 2574–2584.
G. R. Mitchell et al., Nanosecond Photography at 10.6 μm Using Silver Halide Film, Applied Optics/vol. 18, No. 14/15 Jul. 1979.

Primary Examiner—Bruce C. Anderson
Assistant Examiner—Paul A. Guss
Attorney, Agent, or Firm—Donald J. Singer; Bobby D. Scearce; John R. Flanagan

[57] ABSTRACT

A method of photographically recording at high speed the far field pattern of a high energy infrared laser beam over a selected period of time for providing rapid repetitive samples of information on beam parameters such as far field beam intensity, jitter, and absolute beam size and power. A sample from a high energy infrared laser beam is directed into an enclosure that is light tight to visible radiation and contains an operating lensless movie camera loaded with suitable movie film. The infrared beam is focused on the film plane of the camera so that consecutive frames of the film are irradiated by the infrared beam each time the camera shutter is open. The period of irradiation is of sufficient duration to sensitize the film to visible radiation in the areas where the infrared radiation impinges on the film. The position of the camera shutter is detected and an electrical trigger signal generated just before the shutter is closed for each frame. The trigger signal is applied to appropriate circuitry which actuates a light source to generate a pulse of visible light that irradiates the film plane of the camera near the end of each shutter movement to expose each frame of the film. The exposed film strip is developed to provide a continuous record of the infrared laser beam characteristics over the selected period of time.

9 Claims, 5 Drawing Figures

METHOD AND APPARATUS FOR HIGH SPEED, SUSTAINED RECORDING OF INFRARED LASER BEAM PATTERNS

STATEMENT OF GOVERNMENT INTEREST

The invention described herein was made by U.S. Air Force Employees and may be manufactured and used by or for the Government for governmental purposes without the payment of any royalty thereon.

BACKGROUND OF THE INVENTION

This invention is in the general field of infrared (IR) radiation photography. More particularly it pertains to the high speed photographic recording of far field IR laser beam patterns during the entire period when a high energy laser is operating so that the characteristics of the laser beam over the entire cycle of laser operation can be determined.

There is extensive research being conducted on IR laser systems at the present time and one of the areas under continuous investigation is how to improve the evaluation of the various characteristics of the laser beam. This evaluation is often referred to as beam diagnosis. Some of the beam characteristics to be diagnosed or determined are far field beam intensity, near field phase, jitter and absolute power of the beam. The usual approach to monitoring IR beams for these parameters is to use electronics intensive electro-optic techniques requiring very expensive photodetectors, recorders and signal processing equipment. Since these techniques are expensive and time consuming to use, other simpler approaches are needed.

It has been suggested in the literature by Frazier et al., Applied Optics/Vol. 15, No. 6/June 1976, that IR photography might be attractive for photography of far-field high energy laser mode patterns. Frazier discloses in U.S. Pat. No. 4,018,608 a process for photographing IR laser beam patterns on silver halide film by first impinging an IR laser beam on the film and then flashing the film with visible light. Both of the Frazier publications identified above contain a discussion of IR presensitization photography. IR sensitization theory is also discussed by Naor et al. in Applied Optics/ Vol 20, No. 14/15 July 1981. Naor et al. theorizes that the sensitization of the photographic film results from the heating produced in the photographic emulsion by the IR radiation. Naor et al. also explains that the film may be sensitized or desensitized depending upon the duration of the visible exposure that follows the IR exposure. Naor et al. further reports that sensitivity effects were improved by delays shorter than 0.5 msec between the IR and visible exposure. The basic approach used in all of the investigations discussed above, and in the invention disclosed in this application, utilizes direct photographic recording of IR radiation on silver halide film. Two sequential exposures are made, an IR exposure to sensitize a portion of the film, followed immediately by a uniform visible exposure of all the film in the frame. After development those areas of the film that have been exposed to IR and visible radiation are darker than the areas that have only been exposed to visible radiation.

SUMMARY OF THE INVENTION

It is a principal object of the present invention to provide a method and apparatus that can be used to determine the characteristics of a continuous wave high energy laser beam over a cycle of operation that extends for several seconds.

It is another object of the invention to provide a laser beam monitoring method and apparatus that is economical to utilize and capable of being quickly set up and used at any target site.

These and other objects of the invention are accomplished as follows. A high speed movie camera and several optical components are mounted on a portable optical table and then enclosed in an enclosure light tight to visible radiation. The visible light tight enclosure is provided with an infrared window so that an IR laser beam sample, which is a faithful rendition of the relative intensity and absolute phase of the laser beam being sampled, can be reflected into the enclosure for recording by the camera equipment mounted therein. The IR laser beam sample is reflected into the enclosure by a parabolic mirror. Once inside the enclosure the IR beam is focused on the film plane of the movie camera. The camera moves the film in steps at a desired rate so a series of film frames are sequentially exposed to the IR radiation through a shutter mechanism in the camera. The film advancing and shutter operating mechanisms are synchronized so that each film frame is stationary while being exposed. A timing mechanism is connected to the film advancing and shutter operating mechanism and synchronized therewith for generating and electrical trigger signal just before the shutter mechanism closes. Shutter closing blocks radiation from the film in the camera. The trigger signal from the timing mechanism is connected into appropriate circuitry which in turn actuates a strobe. The strobe is one of the optical components mounted in the light tight enclosure and it is oriented so that it irradiates the film plane of the camera with a uniform field of visible light.

There results a method of photographing an IR laser beam by focusing the beam on the film plane of a movie camera. The IR beam is a small diameter beam of coherent radiation so it only irradiates a small area of the film relative to the available area of each film frame. The IR sensitizes the film in the areas it irradiates. Just prior to each shutter closure the strobe is actuated to flood the film frame with a very short uniform flash of visible light. The IR beam continues to impinge on the film during and after the time when the film is flashed with visible light. However, any IR energy striking the film after the visible flash is essentially impotent and does not affect the resulting photographic record.

DETAILED DESCRIPTION OF THE INVENTION

Figure 1:
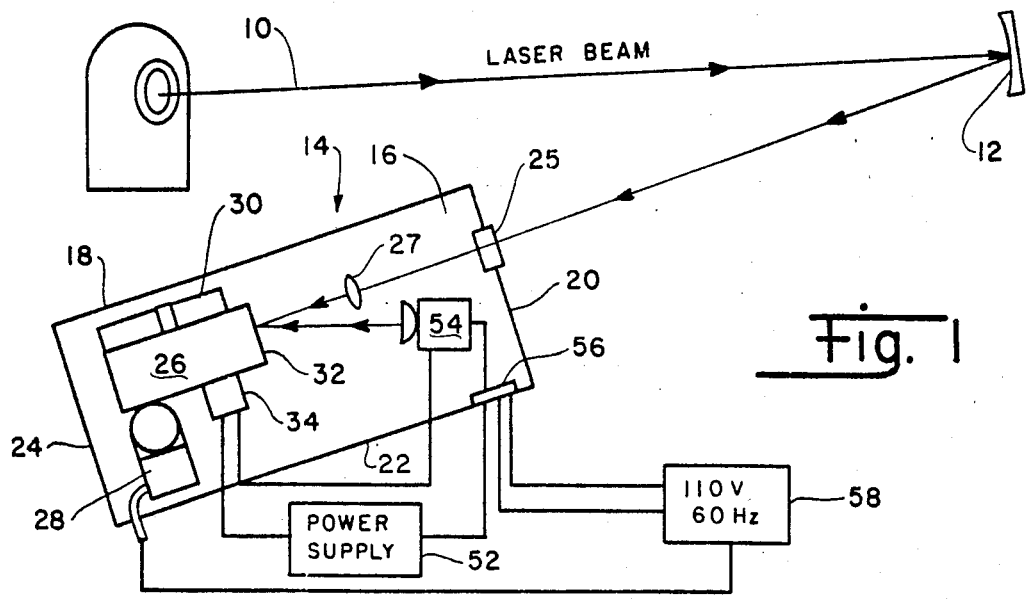
FIG. 1 is a schematic illustration of the system employed to practice the invention.

FIG. 1 of the drawing is a schematic illustration of an actual IR sensor and recording system that was used in a downrange ground test of a gas dynamic laser. The IR output beam of the gas dynamic laser was sampled in a known manner employing diffraction techniques to provide a relatively low power IR beam that is a faithful rendition of the relative intensity and absolute phase of the sampled laser beam. Beam 10 shown in FIG. 1 is the sample beam and it is directed at a large collection mirror 12 which reflects beam 12 to the sensing and recording system 14. System 14 consists of a portable optical table 16 surrounded by a visible light tight enclosure made up of four vertical walls 18, 20, 22 and 24. The enclosure is shown with its top cover (not shown) removed so as to disclose the position of other system components mounted on optical table 16. The floor of the enclosure is provided by optical table 16 which rests on a flat surface that seals off all mounting holes in table 16. IR radiation enters the enclosure through a germanium window 25 mounted in wall 20. The IR radiation is focused on the film plane by a ZnSe lens 27 mounted on the optical table by means of a conventional lens holder (not shown).

Camera 26 is a high speed (144 frames per second) 35 mm step and index type movie camera, Model GC, manufactured by Mitchell Camera Corporation. The camera has a Redlake Model 15-0001 speed control designated by numeral 28. A detachable film container 30 is loaded with several hundred feet of 35 mm, KODAK 5369, silver halide film. A shutter mechanism (not shown) located behind side 32 of the camera has an opening therein through which radiation may pass to reach the film plane (not shown) located inside the camera. Since the camera is well known its operation and construction will not be described in complete detail except for the timing circuit modifications shown in FIGS. 2 and 3 that was added thereto to make the camera capable of providing a timing signal just before each shutter closure.

Figure 2:
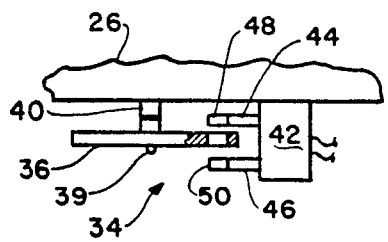
FIG. 2 is a detailed top view of the timing mechanism mounted on the movie camera to carry out the invention.
Figure 3:
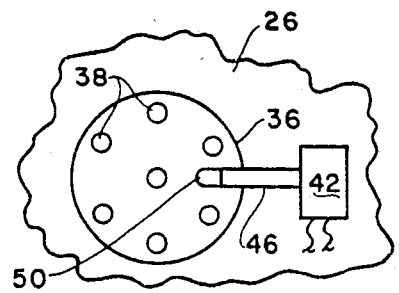
FIG. 3 is a side view of the timing mechanism shown in FIG. 2.

A timing mechanism 34 is mounted on the side of the camera in the manner shown in FIG. 2. A chopper wheel 36 having a suitable number of holes 38 formed at spaced intervals around the periphery thereof is mounted on shaft 40 by bolt 39. Shaft 40 was available on the camera and it rotates with the camera shutter operating mechanism when the camera is operating. Wheel 36 thus rotates with shaft 40 when the camera is operating. The position of wheel 36, and holes 38, relative to the shutter mechanism of camera 26 can be adjusted by loosening bolt 39 and rotating wheel 36 relative to shaft 40. This makes it possible to adjust the timing of the triggering signals from timing mechanism 34 as desired. In some applications it may be desirable to replace the circular openings in the chopper wheel with rectangular slots to obtain more precise chopping of the radiation passing through the openings in the wheel. This function will be described more fully hereafter in the description of how the invention operates. A support block 42, suitably mounted to the side of camera 26 adjacent shaft 40, includes two support members 44 and 46 that extend to a position adjacent the periphery of chopper wheel 36. A light emitting diode 48 is mounted on the end of support member 44 and a photo diode 50 is mounted on support member 46.

Referring again to FIG. 1, the timing mechanism is connected to a 5 volt Hewlett Packard Model 6220B power supply 52 and to a strobe light 54, which is a General Radio Company Strobotac type 1531-2B. Strobe 54 is mounted to the optical table 16 and oriented so that it floods the film plane of camera 26 with uniform field of visible light when triggered by timing mechanism 34. The power supply 52 and strobe 54 are connected to a bus bar 56 mounted on the optical table. Speed control 28 of the camera is connected to a source of 110V power 58 which is also connected to bus bar 56.

Figure 4:
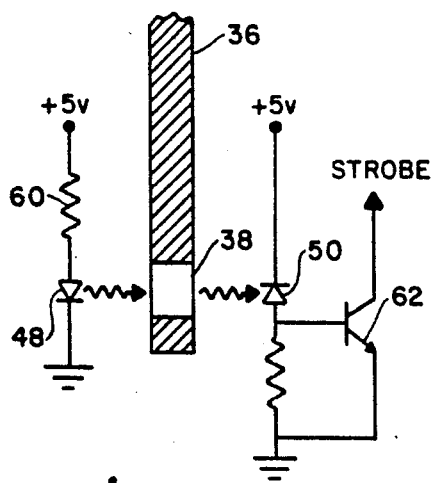
FIG. 4 is a circuit diagram of the timing mechanism.

The timing mechanism and strobe operates as follows when camera 26 is running and power is applied to the system. As shown in FIG. 4, light emitting diode 40 is connected to the 5 volt power supply through resistor 60 and to ground so that it emits radiation in the direction shown by the arrows. This radiation passes through holes 38 in chopper plate 36 and strikes photo diode 50 causing it to conduct and apply a signal to the base of transistor 62. This turns transistor 62 on and connects the strobe to ground. Grounding the strobe causes it to flash. Thus it is possible to trigger the strobe at desired intervals by selecting an appropriate diameter and hole spacing in the chopper wheel and then adjusting the chopper wheel relative to shaft 40.

Figure 5:
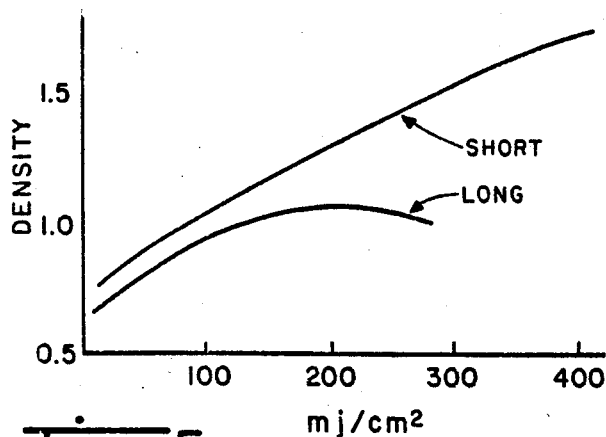
FIG. 5 is a graph that illustrates the improvement in modulation of the presensitized film when a short strobe flash was used to irradiate the film plane with visible light rather than a relatively long pulse of visible radiation.

The overall system operates in the following manner assuming synchronized start up of the laser being tested and system 14. IR laser beam 10 enters the light tight enclosure via window 25. The beam passes through focusing lens 27 and on through the opening in the shutter mechanism (not shown) to strike the film plane of the camera. Normally side 32 of the camera has several lenses mounted thereon that may be rotated over the opening into the shutter mechanism for focussing purposes, but they are removed for this application. The ZnSe lens 27 images the IR radiation reflected by large diameter parabolic mirror 13 onto the film plane of the camera. Mirror 12 provides a large area in which the beam may jitter and still be directed into the clear aperture of lens 27 and imaged onto the camera film plane. The shutter speed and film indexing rate of the camera are adjustable so as to control the frames per second exposed and the length of time each frame is exposed. In the actual downrange laser test to demonstrate the operability of the invention a film indexing rate of 100 frames per second, and a shutter opening time of 1 millisecond was employed. This exposure time was fast enough to freeze out motion induced blur. The IR radiation strikes the film frame during the entire period the shutter is open and sensitizes those areas where the IR radiation impinges. Just before shutter closure, and after almost 1 millisecond of IR exposure, the strobe is triggered. The radiation therefrom enters the camera and exposes the film frame to a 2 microsecond flash of visible light. It was determined that the IR energy coming in after the visible flash was essentially impotent and did not further sensitize the film. In preliminary investigations a 2 millisecond flash from a flash lamp was used to expose film to visible light. It was found that transitioning to a shorter light pulse (the 2 microsecond strobe) resulted in a dramatic increase in modulation of the film. The photographic optical density of the developed beam image was increased by the shorter visible exposure. This result is illustrated in FIG. 5. This means that the area of each film frame exposed to IR radiation is darker when exposed to a short pulse of visible light rather than a longer pulse.

This completes the detailed description of the invention. The particular embodiment disclosed herein was designed for use on a particular laser system; however, since the invention's operation depends on thermal effects, it is intrinsically scalable to permit use with laser systems whose outputs are shorter wavelength IR beams.

What is claimed is:

1. A method of photographically recording at high speed the far field pattern of a high energy infrared laser beam over a selected period of time for providing rapid repetitive samples of information on beam parameters such as far field beam intensity, jitter, and absolute beam size and power, said method comprising the steps of:

reflecting a sample from a high energy infrared laser beam into an enclosure that is light tight to visible radiation and contains an operating lensless movie camera loaded with a suitable film strip, focusing the infrared beam on the film plane of the camera so that consecutive frames of the film are irradiated by the infrared beam each time the camera shutter is open, the period of irradiation being of sufficient duration to sensitize the film to visible radiation in the areas where the infrared radiation impinges on the film, detecting the position of the camera shutter and generating electrical trigger signals just before the shutter is closed for each frame, applying the trigger signals to appropriate circuitry that actuates a light source oriented so as to generate a pulse of visible light that irradiates the film plane of the camera near the end of each shutter movement to expose each frame of the film, developing the film strip so exposed to provide a continuous record of the infrared laser beam characteristics over the selected period of time.

2. The method recited in claim 1 wherein the film speed of the movie camera is 100 frames per second.

3. The method recited in claim 2 wherein the infrared exposure time for each frame of film is 0.001 seconds and the visible light exposure time is 0.000002 seconds.

4. The method recited in claim 3 wherein KODAK 5369 silver halide film was used in the movie camera.

5. The method recited in claim 4 wherein the light source is a strobe light.

6. A portable apparatus that can be positioned in the far field of an IR laser beam sample from a high energy laser for making a photographic record of the far field pattern of the IR beam to provide information on the far field beam intensity, jitter and absolute beam size and power of the high energy laser, said apparatus comprising:

a portable optical table enclosed in an enclosure that includes an infrared window mounted therein and is light tight to visible radiation, collection mirror means positioned in the path of the laser beam and oriented so as to reflect the laser beam into the light tight container through said infrared window and image the IR radiation on a focusing lens means mounted in said enclosure, movie camera means mounted on said optical table that includes a shutter and film operating mechanism for consecutively exposing for a preselected exposure time a preselected number of frames per second to radiation imaged on the film plane of the camera means, timing means mounted on said movie camera for sensing the position of the shutter mechanism and generating an electrical trigger signal just before each closure of the shutter mechanism that electrically grounds a visible light producing means, a focusing lens means mounted on said optical table in the path of incoming infrared radiation for imaging the IR radiation on the film plane of the movie camera to presensitize the film frame located thereon to visible light, visible light producing means mounted on said optical table and electrically connected to said timing means so as to be actuated by the electrical signal from said timing means, said visible light producing means being oriented so as to illuminate the film plane of the movie camera for a brief period just before the shutter closes for uniformly exposing each film frame whereby the film areas exposed to both infrared and visible radiation are darker than those exposed only to visible radiation.

7. The apparatus recited in claim 6 wherein said timing means includes, chopper wheel means having spaced holes formed in the periphery thereof adjustably mounted on said movie camera means so that said chopper wheel rotates with the shutter operating mechanism of said movie camera and is adjustable so as to adjust the angular position of the holes with respect to the shutter operating mechanism, light emitting means mounted on said movie camera and positioned on one said chopper wheel so that radiation emitted thereby passes through the holes in said chopper wheel, light responsive means electrically connected to said visible light producing means and mounted on said movie camera, said light responsive means being positioned on the other side of said chopper wheel so as to receive radiation from said light emitting means that passes through the holes in said chopper wheel and generating an electric signal in response thereto whereby said visible light producing means is caused to be actuated.

8. The apparatus recited in claim 7 wherein said light emitting means is a light emitting diode.

9. The apparatus in claim 8 wherein said light responsive means includes a photo diode and a transistor electrically connected thereto that is turned on by a signal from the photo diode, the turning on of said transistor actuating said visible light producing means.

* * * * *